United States Patent [19]
Long

[11] Patent Number: 5,337,642
[45] Date of Patent: Aug. 16, 1994

[54] PUNCH BLOCK SUPPORT ARM AND PROCESS FOR MOUNTING PUNCHES ON SUCH A BLOCK

[75] Inventor: Michael Long, Rochester, N.Y.

[73] Assignee: Eastman Kodak Company, Rochester, N.Y.

[21] Appl. No.: 930,664

[22] PCT Filed: Mar. 28, 1991

[86] PCT No.: PCT/FR91/00245
§ 371 Date: Oct. 2, 1992
§ 102(e) Date: Oct. 2, 1992

[87] PCT Pub. No.: WO91/15343
PCT Pub. Date: Oct. 17, 1991

[30] Foreign Application Priority Data
Apr. 2, 1990 [FR] France ............... 90 04484

[51] Int. Cl.$^5$ .................................. B26F 1/02
[52] U.S. Cl. .......................... 83/687; 83/620; 83/698.71; 29/515; 29/525.1
[58] Field of Search ............ 83/13, 698, 618, 620, 83/686, 687; 29/515, 525.1

[56] References Cited
U.S. PATENT DOCUMENTS

| | | |
|---|---|---|
| 435,003 | 8/1890 | White et al. |
| 786,853 | 4/1905 | Stickney . |
| 2,220,523 | 11/1940 | Kaganski .................. 164/89 |
| 2,920,913 | 1/1960 | Antila ...................... 287/119 |
| 3,077,135 | 2/1963 | Henn ........................ 83/698 |
| 3,392,617 | 7/1968 | Henn ........................ 83/698 |
| 3,640,170 | 2/1972 | Bennett ..................... 83/698 |
| 3,785,236 | 1/1974 | Peterson .................... 83/685 |
| 4,096,776 | 6/1978 | Laucke ...................... 83/698 |
| 4,131,047 | 12/1978 | Schriber et al. ............. 83/698 |
| 4,583,631 | 4/1986 | Yonezawa et al. ............ 198/345 |
| 5,146,832 | 9/1992 | Wilson et al. ............... 83/698 |

Primary Examiner—Hien H. Phan
Attorney, Agent, or Firm—Charles E. Snee, III

[57] ABSTRACT

The invention concerns a punch block support arm adaptable to a perforating device as well as a process for mounting punches on such a block. According to the invention, the block comprises a narrow slot (12, 20, 23) across the whole block thickness, and extending on the whole length of the punch array. The slot extends, at each of its ends (23), perpendicular to the alignment axis (26) of the punches (20, 22), in order to define a longitudinal bar (14) and two transversal bars (15, 16), the slot being located so that the distortion of the longitudinal bar brings relatively closer the portions of transversal bars so as to immobilize the punches.

8 Claims, 3 Drawing Sheets

PUNCH BLOCK SUPPORT ARM AND PROCESS FOR MOUNTING PUNCHES ON SUCH A BLOCK

TECHNICAL FIELD

The invention relates to a punch block support arm, as well as to a process for mounting punches on such a block.

BACKGROUND ART

Parallel to their edges, photographic films, for example, incorporate one or two arrays of perforations which enable the film to be driven in devices for, exposing images onto and projecting images from the film, and in processing machines. In the use of photographic films, it is known that the quality of the projection, particularly the stability of the images on the screen, is closely dependent on the quality of the perforations, i.e. on the constancy of their pitch and on the accuracy of execution of each perforation. In this respect, the tolerance required is extremely fine, in the order of only a few microns on the finished perforation.

The accuracy of execution of the perforations depends on the accuracy of the movement of the punches at the time of perforation, though it also depends on the accuracy of mounting said punches.

In reciprocating movement type perforators, the punches are generally mounted on a block of a suitable thickness. The block is fastened to the upper jaw of the perforating device, and it is arranged so that the punches cooperate periodically with a die block held on the lower jaw of the perforating device.

FIG. 1 represents a punch block support arm on which the punches are mounted as in the earlier technique. The block represented comprises an array composed of 15 punches 1. The arrangement of these punches is represented in greater detail in FIG. 2. Each punch is housed in a recess 2 of suitable size and shape to receive on the one hand the punch 3 and on the other hand a positioning wedge 4 arranged so as to press on two adjacent faces of punch 3.

Wedge 4 is arranged so that its axis 5 forms an angle of approximately 45° in relation to the alignment axis 6 of the punches. Recess 2 is extended along axis 5 so as to receive a screw 7 intended to press on wedge 4, thereby immobilising punch 3 at the same time along alignment axis b of said punches and along an axis perpendicular to the alignment axis. According to this technique, the positioning of the punches is adjusted individually. The drawbacks of such a technique are mainly as follows :

- when one of the screws associated with one of the punches is loosened, the punch is no longer held in position;
- such an arrangement of the positioning wedges involves the screws associated with two adjacent punches being relatively close to each other and this can prevent the use of screws of sufficient size to achieve the required tightening;
- the shape of the recesses intended to receive the punches and the positioning wedges is relatively complex to achieve and involves fairly long construction times.

SUMMARY OF THE INVENTION

Therefore, one of the objects of this invention is to realise a punch block support arm, as well as a process for mounting punches on such a punch block support arm, which are simpler and cheaper than those of the earlier technique.

Another object of this invention is to permit more reliable positioning of the punches on a punch block support arm.

Other objects of this invention will appear during the more detailed description which follows.

The objects of this invention are achieved by providing a punch block support arm comprising at least one array of at least two punches, characterised in that
- immobilisation of the punches translationally in a perpendicular direction to the alignment axis of said punches, as well as in their own longitudinal direction, is realised by means of a screw associated with each of the punches of the array; and
- immobilisation of the punches translationally in the direction of the alignment axis of the punches is achieved by means of a narrow slot across the whole block thickness, the slot extending along the entire length of the punches. The slot extends, at each of its ends, perpendicular to the alignment axis of the punches, in order to define a longitudinal bar and two portions of transversal bars, the slot being located so that the distortion of the longitudinal bar brings relatively closer the portions of transversal bars so as to immobilise the punches.

According to this invention, a process is also realised for mounting punches on a block, the punches being arranged in arrays comprising at least two punches in which :
- the punches are immobilised translationally, in a perpendicular direction to the alignment axis of the punches, as well as in their own longitudinal direction, by means of a screw associated with each of the punches of the array;
- b) the punches are immobilised translationally in the direction of the alignment axis of the punches by means of a narrow slot across the whole punch block support arm thickness, the slot extending on the whole length of the punch array. The slot extends, at each of its ends, perpendicular to the alignment axis of the punches, in order to define a longitudinal bar and two portions of transversal bars, the punches being immobilised by a distortion of the longitudinal bar, which distortion brings relatively closer the portions of transversal bars.

BRIEF DESCRIPTION OF THE DRAWINGS

The detailed description following makes reference to the drawings in which.

DETAILED DESCRIPTION OF THE INVENTION

Figure 1:
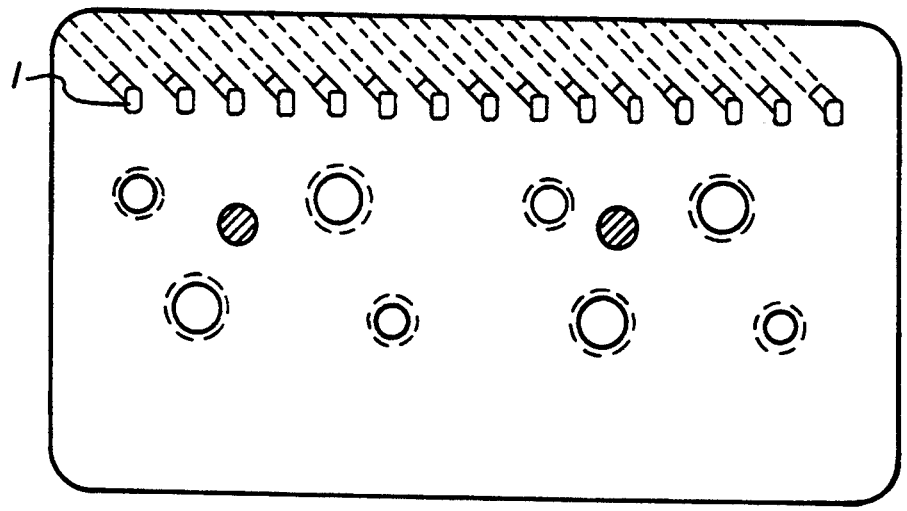
FIG. 1 represents a punch block support arm on which the punches are mounted as in the earlier technique.
Figure 3:
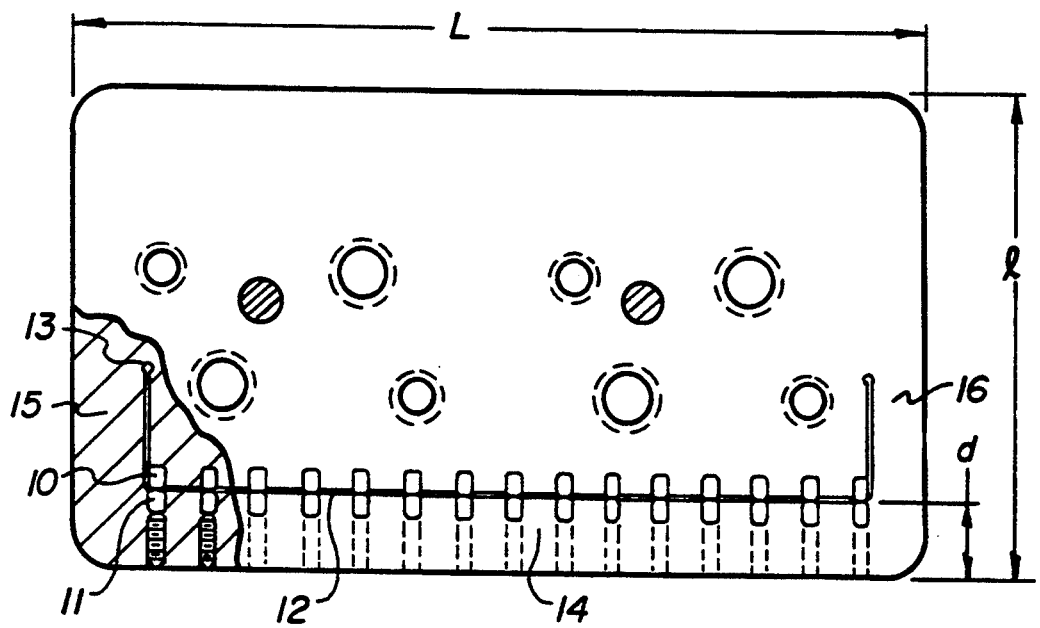
FIG. 3 represents a punch block support arm on which the punches are mounted according to this invention.
Figure 2:
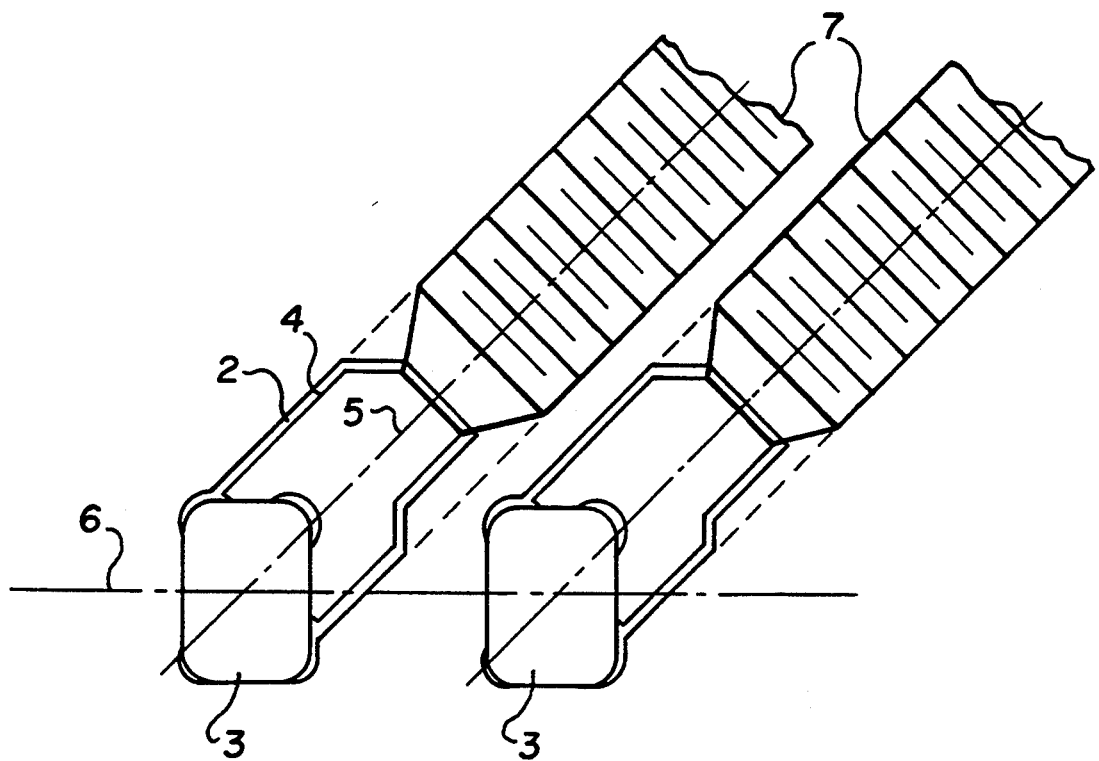
FIG. 2 represents in greater detail the arrangement of the punches on the punch block support arm of FIG. 1.

In the embodiment of FIG. 3, the punch block support arm including an array comprising 15 punches 10 spaced according to a uniform pitch. It is clear that the invention is not limited to this number of punches and it relates, in general terms, to any perforating device comprising preferably at least two punches. The punch block support arm comprises, for each punch, a recess of notably rectangular shape, in order to receive on the one hand the punch, and on the other hand, according to one possible embodiment, a positioning wedge 11 arranged perpendicular to the alignment axis of the punches. According to this invention, a narrow slot 12 is provided which extends notably on the whole length of the array of punches and crossing each of the recesses. According to one embodiment, slot 12 crosses each of the recesses, approximately at their middle. Slot 12 crosses the punch block support arm on the whole block thickness. Longitudinal slot 12 extends at each of its ends, perpendicular to the alignment axis of the punches. According to one preferred embodiment, the end of each of the extensions is characterised by a notably circular recess 13 so as not to weaken the piece too much at these points. This type of arrangement makes it possible to define in this way a longitudinal bar 14 and two portions of transversal bars 15, 16.

Figure 4:
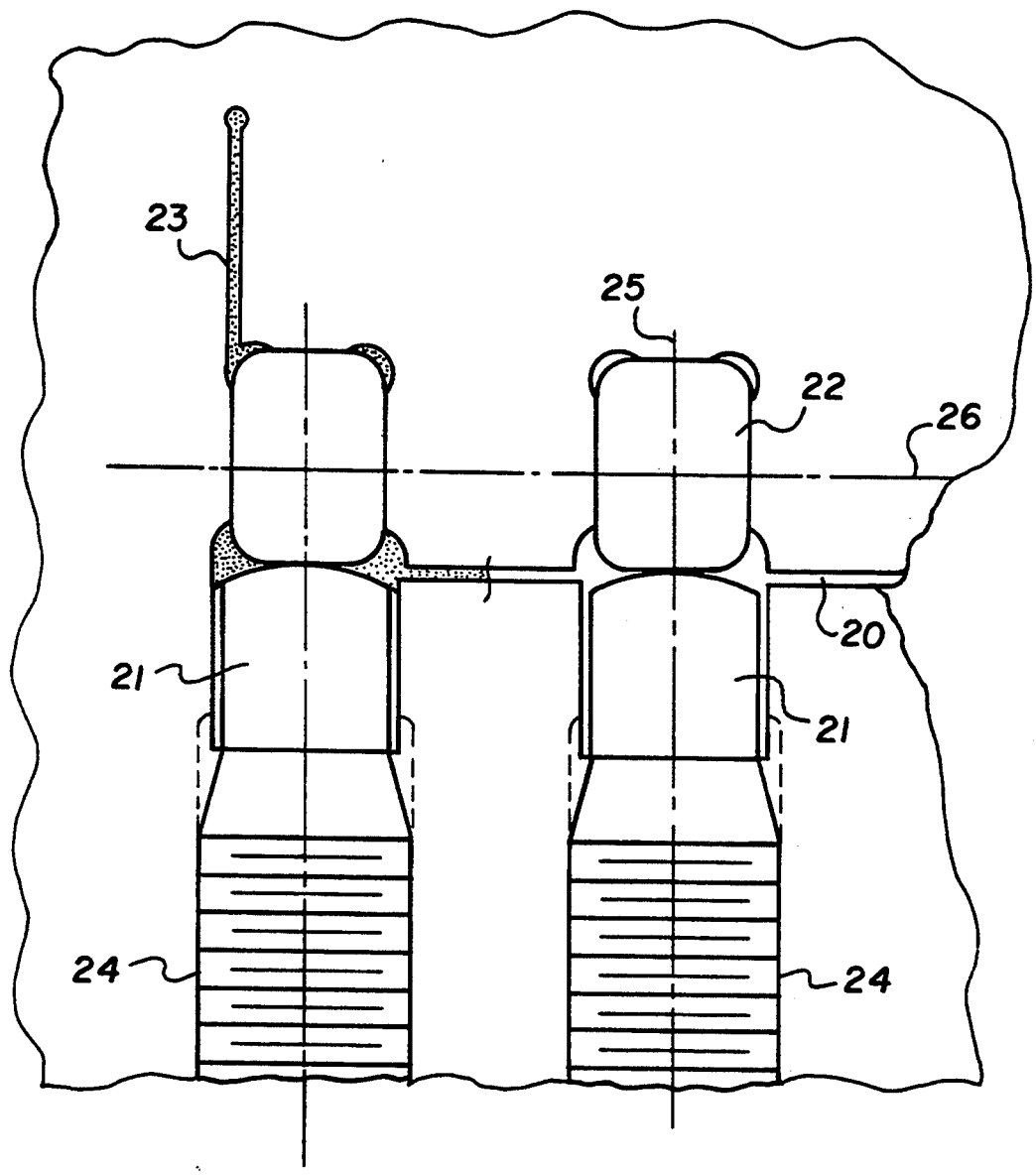
FIG. 4 represents in greater detail the arrangement of the punches on the punch block support arm of FIG. 3.

A more detailed view of the arrangement of the punches is represented in FIG. 4. As is represented in FIG. 4, the longitudinal slot 20 is realised substantially at the interface between the positioning wedges 21 and the punches 22. Likewise, it will be noted that in FIG. 4 the end punches of the array are not distant from the transversal portions 23 of the slot; on the contrary, the recess intended to receive the end punches is located in the extension of the slot, so that the end punches rest directly on the respective transversal bars. This type of arrangement offers the advantage of reducing the stresses exerted on the punch block support arm.

In contrast to the previous technique, in which the positioning wedge defined an angle of approximately 45° to the alignment axis of the punches and in which the wedge was designed to press on two of the faces of the punch, according to this invention, the positioning wedge 21 is positioned in the extension of the punch and, therefore, presses only on one single face of the punch. A screw 24 positioned in the extension of the positioning wedge presses wedge 21 against punch 22 so as to immobilise it translationally along an axis 25 perpendicular to an alignment axis 26 of the punches. The screws also act to immobilise the punches along their own longitudinal direction, i.e. along the axis of the movement of the punch block support arm when it is mounted on a perforating device. According to one embodiment, a screw is associated in the same way with each punch. Thus, when the force resulting from tightening the screws is sufficient, this will result in causing an outward bending or distortion of longitudinal bar 14. This distortion brings the portions of transversal bars 15, 16 closer to each other, thereby immobilising the punches along alignment axis 26. This type of arrangement makes it possible to achieve uniform tightening of the punches on the whole length of the array and, should one (or several) of the screws associated with one (or several) of the punches come undone, the punch(es) assigned with one loosened screw(s) would remain held in position by the force produced by the remaining screws. Distortion in said longitudinal bar 14 may be obtained by other similar means, since it may occur from one or several screws (with a diameter greater than those used in the previous embodiment provided in one or several places on the longitudinal bar.

Clearly, slot 20, 23 must not be positioned too close to the edge of the block and, likewise, it must not be positioned too far from it, so as to obtain sufficient, but not excessive, flexibility, so as to allow correct tightening of the punches. Preferably, slot 20, 23 is provided at a distance of between 5 mm and 10 mm from the edge, though of course this distance depends on the length of longitudinal bar 14 and on the material employed. This type of arrangement thus ensures that the punches are completely immobilised in the space inside the block.

According to a preferred embodiment, slot 20, 23 is filled with a flexible material which can be distorted, such as silicone, so as to be able to retain in position the positioning wedges when the punches are removed. This is shown schematically by the stippled area 27 on the right side of FIG. 4.

By way of example, this slot is achieved by electroerosion and, preferably, it should be as narrow as possible.

By way of example, the numerical values which can be employed in this type of device are as follows :

dimensions of the punch block support arm length=8 cm; width=4.5 cm; and height=12 mm, number of punches : 15 distance between the slot and the edge of the block : d=7 mm width of the slot : ¼ mm force exerted by the screws perpendicularly to the alignment axis of the punches : 120 N torque force exerted by the portions of transversal bars : 3 000N distortion at the middle of the longitudinal bar : 1.3 mm diameter of the screws : 2.8 mm material used : hard steel.

In the embodiment of FIG. 3, the punch block support arm comprises a single array of punches; however, it is obvious that this type of block could comprise a second array of punches on the opposite side of said block.

According to a preferred embodiment, shown on the right side of FIG. 4, the positioning wedges are eliminated, so that the screws press directly on the punches. This type of arrangement simplifies mounting of said punches on this type of block.

I claim:

1. A punch apparatus comprising:
    a block having a thickness, a first edge and second and third opposed edges transverse to the first edge;
    a plurality of punch-receiving recesses extended through the thickness along and transverse to an alignment axis and adjacent to the first edge;
    a plurality of punches positioned in the recesses;
    a narrow slot extended through the thickness and also extended through each recess, the slot having opposite end portions extended transverse to the alignment axis and extended away from the first edge of the block adjacent to the opposed second and third edges, whereby a longitudinal bar is defined between the slot and the first edge and respective transversal bars, joined to the block and the longitudinal bar, are defined between the opposite end portions of the narrow slot and the second and third edges; and
    a plurality of screws, each threaded through the longitudinal bar for engaging one of the punches, the screws thus constituting means, effective upon tightening of the screws into engagement with the punches, not only for securing the punches against movement through the recesses transverse to the alignment axis, but also for distorting the longitudinal bar away from the punches and at the same time distorting the transversal bars toward the punches to secure the punches against movement along the alignment axis.

2. A punch apparatus according to claim 1, wherein the plurality of punches comprises an array of fifteen punches.

3. A punch apparatus according to claim 1, wherein the narrow slot has been formed by electro-erosion.

4. A punch apparatus according to claim 1, wherein one punch at each end of the slot is engaged directly by an adjacent transversal bar.

5. A punch apparatus according to claim 1, wherein the screws engage directly with the punches.

6. A punch apparatus according to claim 1, wherein each of the screws engages with its respective punch through a respective intermediate positioning wedge.

7. A punch apparatus according to claim 6, wherein the narrow slot is filled with a flexible, distortable material for retaining the wedges when the punches are removed.

8. A process for mounting punches, comprising the steps of:

providing a block having a thickness, a first edge and second and third opposed edges transverse to the first edge;

providing a plurality of punch-receiving recesses extended through the thickness along an alignment axis and adjacent to the first edge;

providing a narrow slot extended through the thickness and also extended through each recess, the slot having opposite end portions extended transverse to the alignment axis and extended away from the first edge of the block adjacent to the opposed second and third edges, thereby a longitudinal bar is defined between the slot and the first edge and respective transversal bars, joined to the block and the longitudinal bar, are defined between the opposite end portions of the narrow slot and the second and third edges;

positioning a plurality of punches in the recesses;

threading a plurality of screws through eh longitudinal bar, each screw for engaging one of the punches; and tightening the screws into engagement with the punches; thereby not only securing the punches against movement through the recesses transverse to the alignment axis, but also distorting the longitudinal bar away from the punches and at the same time distorting the transversal bars toward the punches to secure the punches against movement along the alignment axis.

* * * * *